(12) United States Patent
Berg et al.

(10) Patent No.: US 9,099,851 B2
(45) Date of Patent: Aug. 4, 2015

(54) ROTARY JOINT/SWIVEL DEVICE

(75) Inventors: Arne Berg, Kattem (NO); Roar Furuhaug, Trondheim (NO)

(73) Assignee: Optoplan AS, Tiller (NO)

(*) Notice: Subject to any disclaimer, the term of this patent is extended or adjusted under 35 U.S.C. 154(b) by 387 days.

(21) Appl. No.: 13/634,419

(22) PCT Filed: Mar. 11, 2011

(86) PCT No.: PCT/EP2011/053703
§ 371 (c)(1),
(2), (4) Date: Sep. 12, 2012

(87) PCT Pub. No.: WO2011/110667
PCT Pub. Date: Sep. 15, 2011

(65) Prior Publication Data
US 2013/0003496 A1 Jan. 3, 2013

(30) Foreign Application Priority Data
Mar. 12, 2010 (EP) .................................... 10156298

(51) Int. Cl.
*B66F 3/00* (2006.01)
*H02G 1/10* (2006.01)
*H02G 11/00* (2006.01)
(52) U.S. Cl.
CPC ................. *H02G 1/10* (2013.01); *H02G 11/00* (2013.01); *Y10T 29/49826* (2015.01)
(58) Field of Classification Search
USPC ................... 254/133 R, 134; 242/386, 388.5
See application file for complete search history.

(56) References Cited

U.S. PATENT DOCUMENTS

| | | | | |
|---|---|---|---|---|
| 3,822,834 A | * | 7/1974 | Fjarlie | 242/388.5 |
| 4,795,107 A | * | 1/1989 | Williams | 242/388.6 |
| 5,058,819 A | | 10/1991 | Lacour | |
| 5,284,323 A | | 2/1994 | Pawkett | |

FOREIGN PATENT DOCUMENTS

| | | |
|---|---|---|
| FR | 2 188 593 | 1/1974 |
| FR | 2 645 360 | 10/1990 |
| GB | 1 416 486 | 12/1975 |
| GB | 2 210 355 | 6/1989 |
| GB | 2 424 315 | 9/2006 |
| GB | 2 437 406 | 10/2007 |

* cited by examiner

*Primary Examiner* — Lee D Wilson
*Assistant Examiner* — Shantese McDonald
(74) *Attorney, Agent, or Firm* — Pearl Cohen Zedek Latzer Baratz LLP (57) ABSTRACT

A rotary joint or swivel device for ensuring a continuous connection between two items that rotates with respect to each other, for example between an instrumentation unit on a fixed installation and sensor elements in a cable on a rotating cable reel or drum, is provided. The rotary joint or swivel device comprises a minimum of two spools $1_{A,B}$ to coil a connecting cable 3. A first spool $1_A$ is coupled to a first, static, item 40. A second spool $1_B$ is coupled to a second, rotatable, item 30. A guiding arm 4 feeds the connecting cable 3 from the first $1_A$ to the second $1_B$ spool. Correspondingly, a method for ensuring a continuous connection between two items 30,40 that rotates with respect to each other is provided. The method comprises arranging a rotary joint or swivel device according to any of the embodiments of the invention between the two items.

26 Claims, 5 Drawing Sheets

ROTARY JOINT/SWIVEL DEVICE

CROSS-REFERENCE TO RELATED APPLICATIONS

This application is a National Phase Application of PCT International Application No. PCT/EP2011/053703, entitled "ROTARY JOINT/SWIVEL DEVICE", International Filing Date Mar. 11, 2011, published on Sep. 15, 2011as International Publication No. WO 2011/110667, which in turn claims priority from EP Patent Application No. 10156298.1, filed Mar. 12, 2010, both of which are incorporated herein by reference in their entirety.

FIELD OF THE INVENTION

The present invention relates in general to a swivel device or a rotary joint for use in connecting devices on fixed parts with devices on rotatable parts using a cable.

In more detail the present invention relates to a device and method for maintaining continuous contact and/or communication between two items that rotate with respect to each other, for example the communication between a cable on a rotatable cable drum and a fixed installation.

In even more detail the present invention relates to a continuously operating communication connecting between control equipment or an instrumentation unit (the first item) and a seismic cable (the second item) being deployed or retrieved on or off a cable drum or reel, for example the continuously operating connection of optical fibre instrumentation on a vessel with optical fibre sensor devices in a seismic streamer cable which is being deployed or towed behind the vessel or with optical fibre sensor devices in an ocean bottom seismic cable that is deployed or retrieved from or onto a cable reel or drum.

BACKGROUND OF THE INVENTION

Many technologies use some type of slip ring/rotary joint when there is a need for continuous contact and/or communication between items that are rotatable with respect to each other. One example is electrical slip rings which have wide spread application. They can be made for high frequency communication or high power applications. Rotary joints are also available for fluids like jet fuel when the hose is unreeled and connected to the wings of a plane.

Fibre optic rotary joints are also available. Commercial products are usually based on cutting of the fibre and inserting lenses and prisms to create an air gap which could allow for rotation of the parts on each side of the air gap. However, the number of fibres in the joints is very limited and the performance is not acceptable for many applications. The loss is fairly high and it is difficult to maintain a stable transmitted signal amplitude during rotation. Back reflection is another limitation of such a concept.

The above state-of-the-art reflects the fact that it is desirable to have a device which could allow for a fairly large number of rotations of one end of a system without causing breakage of cables or undesirable signal disturbances. In applications where only a single or couple of turns is desired, it may be sufficient to allow a cable to allocate such strains, however, if many turns is desirable, it is at present not possible without the sacrifice of signal quality or at the risk of cable damage.

As an example, in the field of offshore seismic surveying activities, a seismic cable is regularly deployed into the sea from a vessel. The seismic cable is typically deployed from a rotatable drum holding the cable. The rotatable drum means that it is difficult to have the cable connected to monitoring equipment during the deployment operation because the rotation inevitably leads to cable torque/twisting which may damage the cable.

In the prior art GB 2424315A describes a solution in which electrical slip rings are provided in a swivel device for allowing electrical signals to be transmitted between a fixed part on a vessel and a cable which may rotate. Further, it is suggested that optical slip rings are known which could achieve a similar function for optical signal transmission members between a fixed part and a rotatable part. Optical slip rings based on the transmission of light over a light transmitting gap, for example in the form of an air gap, between a fixed part and a rotatable part is known. It is a limitation of the device described in GB 2424315A that it is necessary to cut the electrical and optical transmission elements in the cable at the swivel, thus complicating the use of a swivel device with a seismic cable.

The present inventors have not become aware of any previously known rotary joint/swivel device that can achieve this objective for the required number of fibres and thus solve the problem of torque when unloading a continuously connected cable from a rotatable drum without cutting the electrical conductors or optical waveguides to provide for a slip ring solution of the connecting cable, as indicated by the state-of-the-art technology presented in the above mentioned GB-publication.

An alternative technique for avoiding the use of slip rings and rotary couplings in a spooled umbilical system has been disclosed in UK patent no. GB2210355A in which it is described how a cable ribbon is coiled back and forth from a basket to a spool in a spooled umbilical system. The uncontrollable unwinding and folding of the umbilical inside the basket will limit the length of the cable to be handled and represents a risk of a tangle and damage. Although in some applications the umbilical could be shaped in the form of a flat cable to make it easier to handle in a predictable manner, such shaping may in some applications be unpractical or impossible for other reasons.

Hence, a fibre optic swivel that could enable electrical and optical signal transmission through a continuous conductor at a swivel device without cutting the cable and without using slip ring solutions or the like even under many rotations would be advantageous.

In particular, an optical swivel device that do not necessitate the cutting of the cable when handling cables containing optical fibres would simplify the use of such cables when connecting between a fixed structure and a rotatable structure, and improve the operability of such cables.

OBJECT OF THE INVENTION

It is an object of the present invention to ensure a continuously operating connection between two items that rotates with respect to each other, for example between an instrumentation unit on a fixed installation and sensor elements in a cable on a rotating cable reel or drum.

It is a further object of the invention to provide a rotary joint or swivel/rotary joint or swivel-like device that can provide a continuous connection, in particular a fibre-optic or electric connection, between two items that rotates with respect to each other, without using known slip rings solutions that necessitates breaking the signal conductors, and which is suitable for allocating a number of twists/rotations that in traditional solutions would create an unacceptable torque in a cable that is twisted/rotated.

SUMMARY OF THE INVENTION

The objects of the invention are achieved by the use of a continuous element to connect the items together. The present invention eliminates the twist/torque that could typically build up in a straight section of cable between the items. One example is a cable reel. Usually a type of slip ring or rotary joint is used. However, in many applications there is no slip ring/rotary joint with the required characteristics available. One example is when a large number of optical fibres are required in the cable on the reel and they must be continuously connected to the instrumentation onboard the vessel when the reel is operated.

The above objects and several other objects are intended to be obtained in a first aspect of the invention by providing a rotary joint or swivel device for enabling a continuous connection between two items that rotates with respect to each other. The rotary joint or swivel device comprises a minimum of two spools to coil a connecting cable. A first spool is fixedly coupled to a first, static, item, and a second spool is fixedly coupled to a second, rotatable, item. The rotary joint or swivel device has a rotatable guiding arm which feeds the cable between the first spool and the second spool.

In example embodiments of the rotary joint or swivel device according to the invention the connecting cable enters and/or leaves the spools on the same side of the spools. This means that the connecting cable may be taken from the first spool to the second spool or vice versa using a simple cable guiding structure, such a guiding wheel.

Embodiments of the rotary joint or swivel device according to the invention comprises a mechanism to rotate the guiding arm in both directions. Further embodiments of the rotary joint or swivel device according to the invention comprises a system to control the tension in the cable between the spools.

In embodiments of the rotary joint or swivel device according to the invention the first and second spools are in line or have an almost parallel axis of rotation.

In yet further embodiments of the rotary joint or swivel device according to the invention the rotation axis for the guiding arm is in line with or almost parallel to an axis of the spools.

In some embodiments of the rotary joint or swivel device according to the invention the guiding arm may be rotated by one or more devices from a group comprising; electric means, hydraulic means, and mechanical means.

In still further embodiments of the rotary joint or swivel device according to the invention, the guiding arm is controlled by friction or by a torque spring.

Embodiments of the rotary joint or swivel device according to the invention may comprise torque monitoring means on at least one of the minimum two spools or on the guiding arm for feedback control of the position/rotation of the guiding arm.

Further, some embodiments of the rotary joint or swivel device according to the invention comprises positioning means, for example movable guide wheels, that may be arranged so as to be movable, for positioning the connecting cable in a controlled manner onto the spools.

In still further embodiments of the rotary joint or swivel device according to the invention the first and second spools are arranged inside each other.

In embodiments of the rotary joint or swivel device according to the invention the connecting cable is guided by one or more cable guide elements coupled to the guiding arm. The guide elements may comprise one or more wheels having a groove along its wheel rim for the guiding of the cable.

In embodiments of the rotary joint or swivel device according to the invention the guiding arm comprises a mechanical gear device. The mechanical gear device is arranged between the first spool and the second spool. The mechanical gear which may be an integral part of the guiding arm provides a mechanical coupling between the first spool and the second spool. This way a controllable rotation of the guiding arm with respect to the first spool and the second spool is achieved.

In embodiments of the rotary joint or swivel device according to the invention the guiding arm may be coupled to the spools or to a drive via a spring device for maintaining a tight connecting cable between the first and second spools.

In still further embodiments of the rotary joint or swivel device according to the invention the connecting cable includes an optical fibre.

Embodiments of the rotary joint or swivel device according to the invention comprises a control system for controlling the rotation of the guiding arm. This way it may be ensured that the guiding arm is rotated at a rate of rotation adapted for moving a part of the connecting cable between the first and second spools while maintaining the connecting cable tight, i.e. to control the tension in the connecting cable, thus minimizing or avoiding a high tension or slack in the cable, i.e. the connecting cable.

In embodiments of the rotary joint or swivel device according to the invention the first spool is fixed to a vessel, for example on the deck of a vessel.

In further embodiments of the rotary joint or swivel device according to the invention the second spool is coupled to a cable drum or cable reel containing at least a part of a seismic streamer cable.

In yet further embodiments of the rotary joint or swivel according to the invention the guiding arm is controllably rotatable with respect to the rate of rotation of the second spool at a fixed ratio, e.g. at a ratio of 0.5.

The object of the invention and several other objects are also intended to be obtained in a second aspect of the invention providing a method for ensuring a continuously operating connection between two items that rotates with respect to each other, the method comprising arranging a rotary joint or swivel device according to any embodiments of the invention between the two items that rotate with respect to each other.

In some embodiments the method according to the invention comprises the deployment or retrieval of a seismic cable from or onto a vessel at sea.

In further embodiments the method according to the invention comprises the deployment or retrieval of a seismic cable to or from an ocean bottom location.

In yet further embodiments the method according to the invention comprises operating a seismic surveying system, fixing the first spool on a vessel and coupling the second spool to a rotatable drum for deploying or retrieving a seismic cable.

In still further embodiments the method according to the invention the operating a seismic surveying system comprises towing a seismic cable containing an optical fibre behind a vessel at sea.

BRIEF DESCRIPTION OF THE DRAWINGS

The device and method for enabling a continuously operating connection between two items that rotate with respect to each other according to the invention will now be described in more detail with regard to the accompanying figures. The figures show one way of implementing the present invention and is not to be construed as being limiting to other possible embodiments falling within the scope of the attached claim set.

DETAILED DESCRIPTION OF EMBODIMENTS OF THE INVENTION

The present invention is based on the principle of keeping the signals inside optical fibres while staying connected between two items rotatable with respect to each other. The optical fibres will be located in a connecting cable 3 that is moving back and forth between two spools $1_{A,B}$. An example embodiment of the rotary joint or swivel device according to the invention will now be described in more detail with references to FIG. 1 and FIG. 2.

A first spool $1_A$ may be considered as a "static" spool which in some applications may be fixedly coupled to and rotationwise clamped to a first item, such as for example a frame 40 or a similar ground/structure which is not moving with respect to the first spool. The frame 40 could be attached to or be a part of a larger structure such as a deck on a ship 20, indicated on FIG. 7. The connecting cable 3 runs from the first spool 1A and to an instrumentation unit or system control unit 10, that may typically be placed somewhere on a ship 20 or a similar larger structure.

Figure 2:
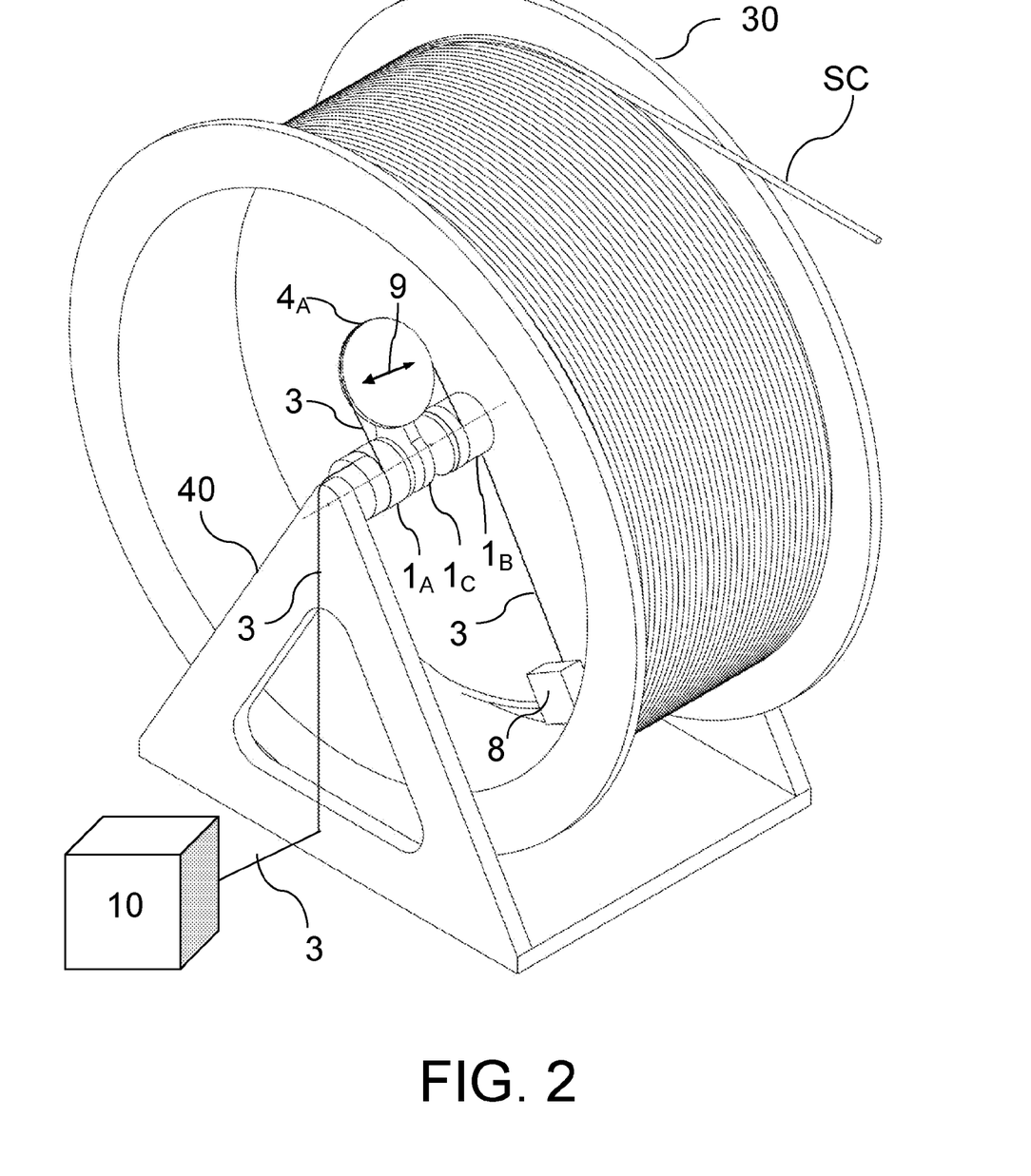
FIG. 2 illustrates a detailed example embodiment of a rotary joint/swivel device according to the invention where it is arranged inside a cable drum or reel.

As can be seen on FIG. 2 a second spool $1_B$ is fixedly coupled to a second item, for example a main cable reel 30 handling a main product such as for example a seismic cable SC, the second item 30 rotatable with respect to the first spool $1_A$. Thus the second spool $1_B$ will rotate with the cable reel 30. A guiding arm 4 feeds the cable back and forth between the spools $1_{A,B}$.

The guiding arm 4 can include a wheel $4_A,9$ that can rotate around its centre axis B and movable 9 as indicated in FIG. 2. The wheel $4_A,9$ is mounted perpendicular to the spools in this basic design. The wheel 9 is mounted on an arm that can rotate around a common axis A of the spools $1_{A,B}$. The arrow on the rotatable wheel 9 indicates that the arm and/or wheel may be movable in a sideways or transversal manner in relation to the common axis A, for example in parallel with the common axis of rotation A of the spools $1_{A,B}$, thus providing a means for positioning the cable in a controlled manner onto the spools $1_{A,B}$. The wheel $4_A,9$ may be moved by for example an electric, hydraulic or mechanical drive. By providing for a parallel or transversal movement option for the guide arm and/or wheel, the cable may be moved along the periphery of the spools, for example in the transversal direction indicated by the arrow 9 on FIG. 2. This will ensure a more controlled and smoother distribution of the cable on the spools.

The wheel $4_A,9$ is a part of the guiding arm 4 that can rotate around the common axis A as defined by the centre axis of the coils of cable on the spools $1_{A,B}$. The wheel $4_A,9$ is free to rotate around its own axis B.

Figure 1:
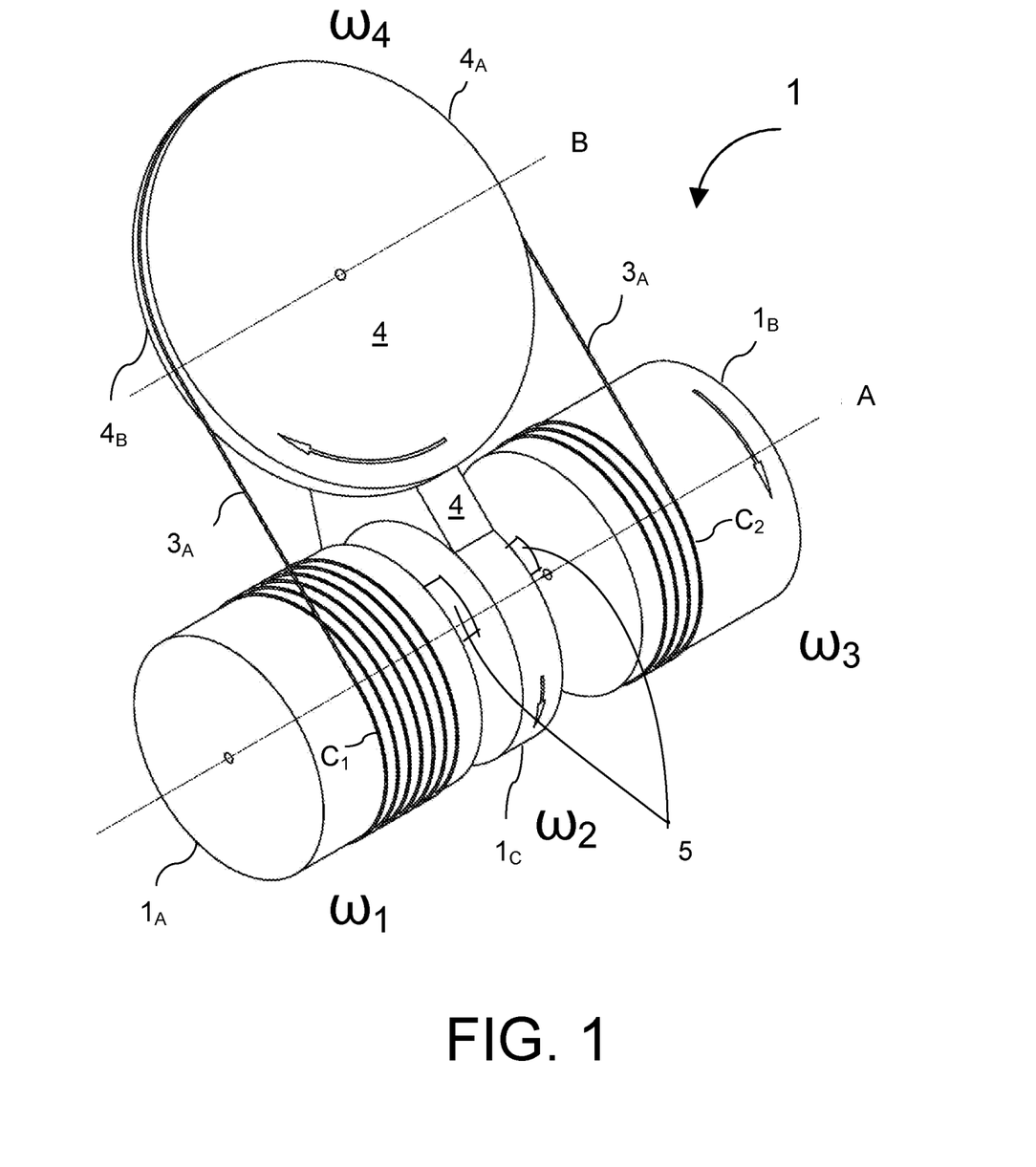
FIG. 1 illustrates a detailed example of application of a rotary joint/swivel device and method for connecting to a rotatable structure as set out by the invention.

The connecting cable 3 mates onto the spools $1_{A,B}$ from the same side in the embodiment of the invention exemplified on on FIG. 1. When both spools $1_{A,B}$ are standing still (no rotation) the cable tension between the spools can be adjusted by the rotational position of the guiding arm 4. If it rotates "with" the spooling direction of the cable the tension in the connecting cable 3 will increase. If it rotates in the opposite direction the tension in the connecting cable will decrease. When one of the spools $1_{A,B}$ starts to rotate the connecting cable 3 in between will be released or tightened. The guiding arm 4 is therefore rotated around the axis of the spools $1_{A,B}$ to pick up and pay out the connecting cable from the respective spools. The guiding arm 4 can be rotated by an electrical or hydraulic motor. The rotation direction and speed is controlled by a sensor measuring the cable strain. The sensor can be located on the guiding arm or the cable tension can be monitored by the torque on one of the spools.

Figure 4:
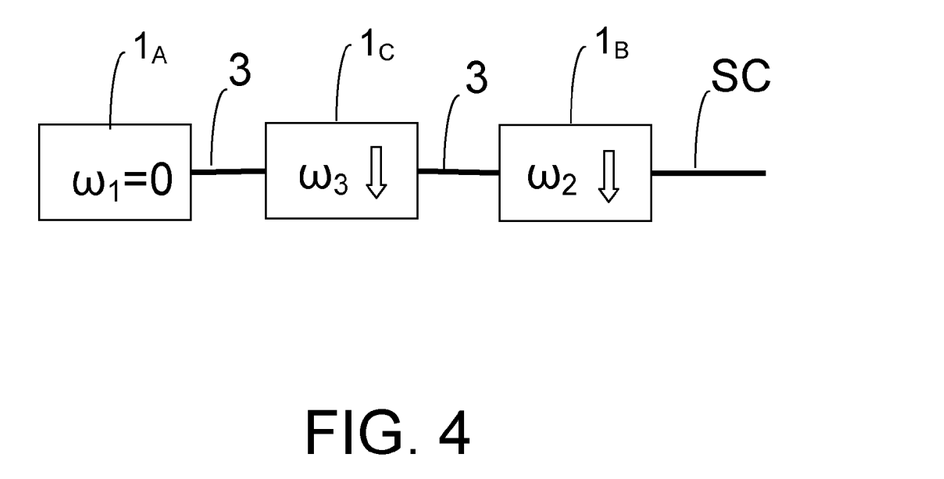
FIG. 4 illustrates the main principle of a rotary joint or swivel device according to the invention and its main elements.

FIG. 4 illustrate the basic concept of a principle of a rotary joint or swivel device according to the invention. A connecting cable 3 is led via a first $1_A$, a second $1_B$ and a third $1_C$ element of a rotary joint or swivel device 1. The first and second elements $1_{A-B}$ may, as explained above, be in the form of spools, and the third element $1_C$ may be in the form of a guiding arm 4 for the cable, i.e. an arm with guide features for the connecting cable 3. The first spool $1_A$ may be regarded as a fixed reference for the other elements of the rotary joint or swivel device, and the reference is indicated by ω=0, meaning this is a fixed reference, for example a fixed element with regard to a fixed structure, for example a vessel in the case where the rotary joint or swivel device is used to handle the seismic cable SC in a seismic surveying operation from a vessel at sea. The first spool $1_A$ carries a first part $C_1$ of the connecting cable 3, in the form of a first coiled part $C_1$ of the cable, the first coiled part being coiled up on the first spool in the form of a cylinder $1_A$ as indicated by the detailed example embodiment illustrated on FIG. 1. The connecting cable 3 may comprise electrical conductors or optical fibres or a combination of both, as required the cable to be handled, i.e. a seismic cable SC.

The second spool $1_B$ is rotatable at an angular speed of $\omega_2$ with respect to the first spool $1_A$, and carries a second part $C_2$ of the connecting cable 3, preferably in the form of a second coiled part $C_2$ of the cable, the second coiled part being coiled up on a second element in the form of a cylinder $1_B$, as indicated on FIG. 1.

A guiding arm $4,1_C$ is rotatable with respect to the first $1_A$ and the second $1_B$ spools and carries an intermediate section $3_3$ of the connecting cable 3, the intermediate section connecting the first coiled part $C_1$ and the second coiled part $C_2$ of the connecting cable 3. In order to operate the rotary joint or swivel device according to the invention the guiding arm $1_C$ is controllably rotatable at a rate suitable for moving a part of the connecting cable 3 between the first and second spools while maintaining the cable tight, that is, by minimizing or avoiding cable slack.

The operating range of the rotary joint/swivel of this invention, i.e. the number of turns possible, is limited by the number of turns/lengths of the part of the connecting cable 3 in the coils in the first $C_1$ and second $C_2$ coiled parts.

The general principle of the rotation of the different parts of the rotary joint or swivel device according to the invention is indicated on FIG. 4. As an example, when the diameters of the cable coils on the first and second spools $1_{A,B}$ holding the connecting cable 3 are equal or almost equal, the guiding arm $1_C$ should be set to be rotatable at equal to or close to half the rate of rotation of the second spool $1_B$, that is $\omega_3=\omega_2/2$. The rate of rotation of the third element $1_C$ should be within ±5% of the rate of rotation of the second spool $1_B$, that is $\omega_3=\omega_2/2\pm5\%$.

To allow for non-ideal coiling of the cable onto the first and second spools $1_{A,B}$, another 5% uncertainty should be allowed, that is $\omega_3=\omega_2/2\pm10\%$.

Depending on the relationship between the diameter of the cable coil on the second spool and the diameter of the cable coil on the first spool, a suitable rate of rotation of the guiding arm 4 can be set so that any cable taken off the first spool $1_A$ is wound onto the second spool $1_B$ or vice versa.

In operation of the rotary joint or swivel device the second spool $1_B$ rotates in synchronism or close to synchronism with an external device 30, such as for example the seismic cable SC on a cable drum or reel 30, which the connecting cable 3 connects to via a connection unit 8, e.g. a splice box as indicated on FIG. 2, this way even though the cable drum or reel 30 is rotatable a large number of revolutions when paying out or retrieving a seismic cable, a continuous connection with the seismic cable SC may be maintained by using the rotary joint or swivel device according to the invention, thus avoiding or minimizing twist/torque in the cable SC during this operation is possible even though the drum/reel is rotating when deploying or retrieving the cable SC.

The guiding arm $1_C$ is controllably rotatable at a rate of rotation adapted for moving a part of the connecting cable 3 between the first and second spools while maintaining the connecting cable 3 tight, by minimizing or avoiding slack or high tension. As an example the guiding arm $1_c$ may be set to rotate at half the angular speed of the second spool $1_B$ if the dimensions of the first and second spools $1_{A,B}$ are similar. It will be understood from FIG. 2 that the guiding arm $1_C$ is able to take up cable that is paid out from the first spool and simultaneously release cable to the second spool $1_B$, or vice versa, depending on the direction of rotation of the external device 30. For most practical purposes the guiding arm $1_C$ rotates around the same axis A as the second spool $1_B$, however it is not strictly necessary that the three elements $1_{A,B,C}$ are arranged about a common axis A. The axis of rotation of the guiding arm $1_C$ and the second spool $1_B$ could in some embodiments be slightly differently oriented or offset with respect to each other, while still being able to perform the desired function.

The intermediate part $3_3$ of the cable may be guided by a cable guide device 4. The guide device 4 may be coupled to or it may be an integrated part of the guiding arm $1_C$. The guide device 4 may comprise one or more wheels $4_A$ having a groove or track $4_B$ along the rim of the wheel for the guiding of the cable C.

Figure 5:
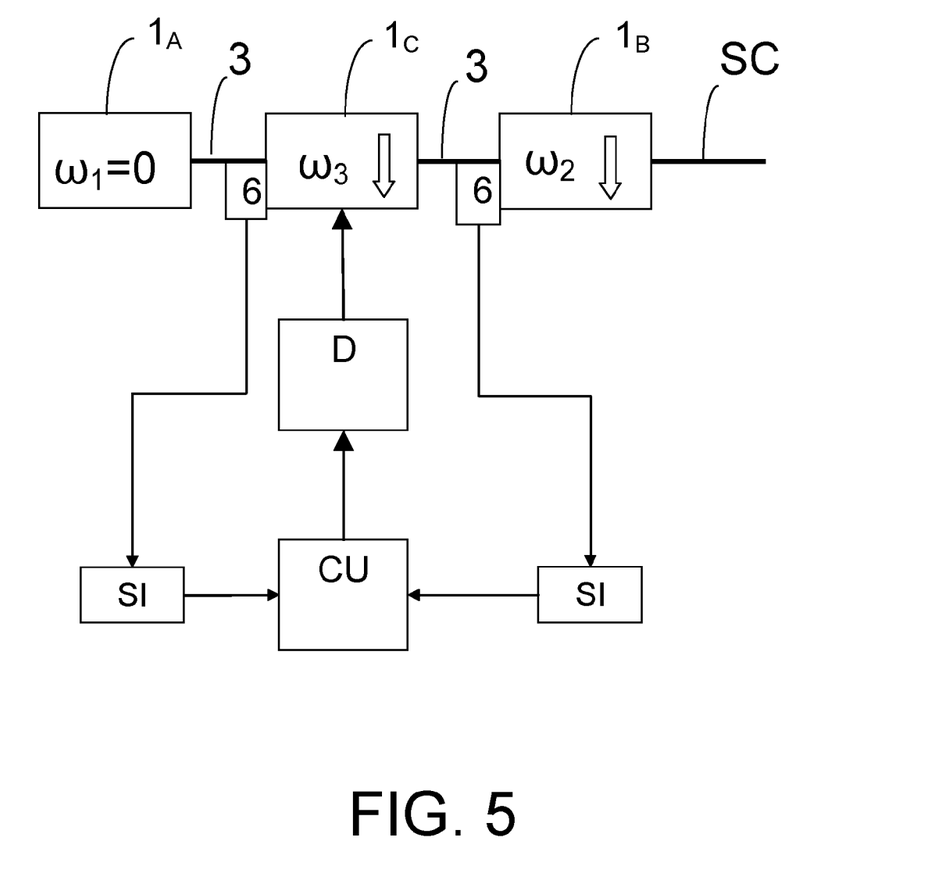
FIG. 5 illustrates one example embodiment of the rotary joint or swivel device according to the invention including a control system.

FIG. 5 illustrates how the swivel device may comprise a control system CU,D for controlling the rotation of the guiding arm 4 to ensure that the guiding arm 4 rotates at the desired rate of rotation with respect to the spools $1_{A,B}$. The control system may comprise a control unit CU which is connected a drive mechanism D. The drive mechanism D is connected to the guiding arm $4,1_C$ of the swivel device for controlling the angular rotation of the guiding arm $4,1_C$. The drive mechanism D may comprise electrical, hydraulic or mechanical drive means, e.g. electric motors. The control unit CU can for example be a programmable device that can be set to control the angular rate of rotation of the guiding arm $4,1_C$, for example, to half the angular rate of rotation of the second spool $1_B$ when the diameter of the spools are the same.

Using a control unit CU to control the angular rotation of the guiding arm $4,1_C$ is not the only way of obtaining the appropriate angular rotational speeds of the guiding arm $1_C$. Alternatively, a mechanical gear device 5 could be used as the driving means D for the guiding arm 4. Such a mechanical gear device 5 provides a coupling between the spools $1_{B,C}$ and the guiding arm 4 of the rotary joint or swivel device 1, as indicated on FIG. 1. Such a mechanical gear device 5 may be an integral part of the guiding arm $1_C$, and is schematically indicated on FIG. 1. Internally, such a mechanical gear device 5 operates similarly to differential coupling devices which are commonly used to couple the wheels in automobiles.

Cable slack and/or tension may develop in the connecting cable 3 due to non-ideal rate of rotation of the guiding arm $1_C$. To reduce or avoid such cable slack and/or high tension in the cable a spring device 6 could be used to compensate for such non-ideal effects. The guiding arm $1_C$ of the swivel may be coupled to the cable guide device 4 via the spring device 6, for example in the form of a torsional spring, for example like the spring in a clockwork, capable of maintaining a spring force through several rotations of the guiding arm $1_C$. The spring device 6 should be coupled between the drive mechanism D and the guiding arm 4 or—if a mechanical gear device is used—between the mechanical gear device 5 and the other parts of the guiding arm 4. This will ensure that the rate of rotation of the guiding arm can deviate slightly from the ideal rate of rotation without causing an undue cable slack or cable strain, and the spring will reduce this deviation by pulling the guiding arm back to its standard position if the strain or slack in the cable allows it. In this way it is possible, within the practical limits of the actual spring device 6, to accommodate a difference in the length of connection cable taken up by the second spool and the length released by the first spool, or vice versa. Such differences could arise due to unequal coils on the first and second spools, and unless such differences are accommodated for, a slack in the cable may develop, jeopardizing the operation of the swivel device.

In some embodiments of the rotary joint or swivel device the rate of rotation of the guiding arm 4 is passively controlled to a fixed rate, as for example in the mechanical coupling of FIG. 1. In other embodiments of the rotary joint or swivel device according to the invention the rate of rotation of the guiding arm can be controlled in an active manner, by providing a feedback to the control unit CU from a sensor detecting possible slack in the connection cable C passing between the first and second spools $1_{A,B}$. Cable slack/tension could for example be detected by a cable load detector 6. The cable load detector 6 could be coupled via suitable sensor interfaces SI to the control unit CU so that it may adjust the rate of rotation of the guiding arm 4 in order to take up any possible cable slack or reduce tension in the connecting cable 3.

Figure 6:
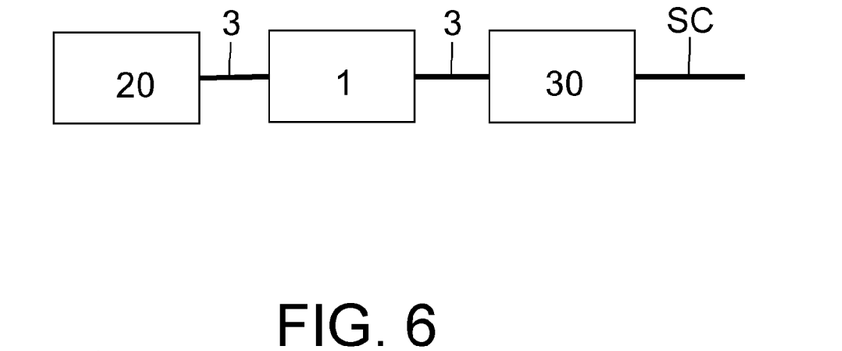
FIG. 6 illustrates the main principle of application of a rotary joint or swivel device according to the invention.

The main principle of application of the rotary joint or swivel device 1 is shown in FIG. 6 which illustrates how the rotary joint or swivel device 1 will be coupled to a first, fixed structure 20. In an example application of the rotary joint or swivel device according to the invention it may be mounted inside a cable reel or drum 30 sitting on the deck of a ship 20 as shown on FIG. 7. In such an example the first spool $1_A$ is fixed to the deck of a vessel, for example via a frame 40, indicated on FIG. 2. Correspondingly, the connecting cable 3 is terminated in a system control unit or instrumentation unit 10 that with the solution described in this disclosure is able to be in continuous communication with sensors and other devices in the seismic cable while the cable is being deployed or retrieved. This enables continuous monitoring of the operation of the components of the system.

The second spool $1_B$ may be coupled using the connecting cable 3 to the second, rotatable item, in this case the cable reel or drum 30. The second spool $1_B$ is coupled to a cable drum 30 containing at least a part of a seismic streamer cable SC to be deployed, retrieved or towed by a vessel.

Above it is described that the first and second spools $1_{A-B}$ have been located next to each other in a side-by-side manner, having almost the same diameter. With a similar diameter of the spools the rotation speed of the guiding arm will have to be about half the rotation speed of the second spool. The guiding arm $1_C$ can also be rotated using gear wheels due to the predictable operation. Small offsets due to cable stretching or temperature effects can be handled by the implementation of friction coupling or torque springs.

In one example embodiment of the rotary joint or swivel device according to the invention is located in a central space of a cable reel, as is shown in FIG. 2. The optimum rotational speed of the guiding arm will depend on the difference in spool diameters, possibly also on the amount of cable that is present on each spool. An automatic rotation of the guiding arm controlled by tension monitoring will automatically compensate for the rotation speed of the spools and the different diameters. This may often be required because the effective spool diameters will also change by the number of cable layers.

The rotary joint or swivel device according to the present invention may be useful in many applications. The cable may include fibre optic elements or electric wires or a combination of both. It may also include a hose or an umbilical including a number of separate channels. One advantage of the present invention is that there will not be any critical points where the medium used, be it an optical fibre or an electric wire, needs to leave the cable. Standard static connectors can be used to connect the cable on the spools to the outside of the rotary joint or swivel device of the present invention. The cable on the spools may be optimised for this application and is not necessarily identical to the cables connected at either side. Even though on FIG. 2 there is shown a connection unit 8, e.g. a splice box, for coupling the connecting cable 3 to for example a seismic cable SC, i.e. a cable of of another type, it will be apparent for a person skilled in the art upon reading this disclosure that the connecting cable 3 and the cable SC to be deployed may be of a similar or even of the same type. In such cases the splice box 8 may in some applications not be required.

The principle of the rotary joint or swivel device according to the present invention is not limited to a side-by-side configuration of the spools. The spools may also be located inside each other to make the unit more compact, as illustrated in FIG. 3, where three guide wheels $4_A$ are used to guide the connecting cable 3 between a first spool $1_A$ arranged inside a second spool $1_B$.

Figure 3:
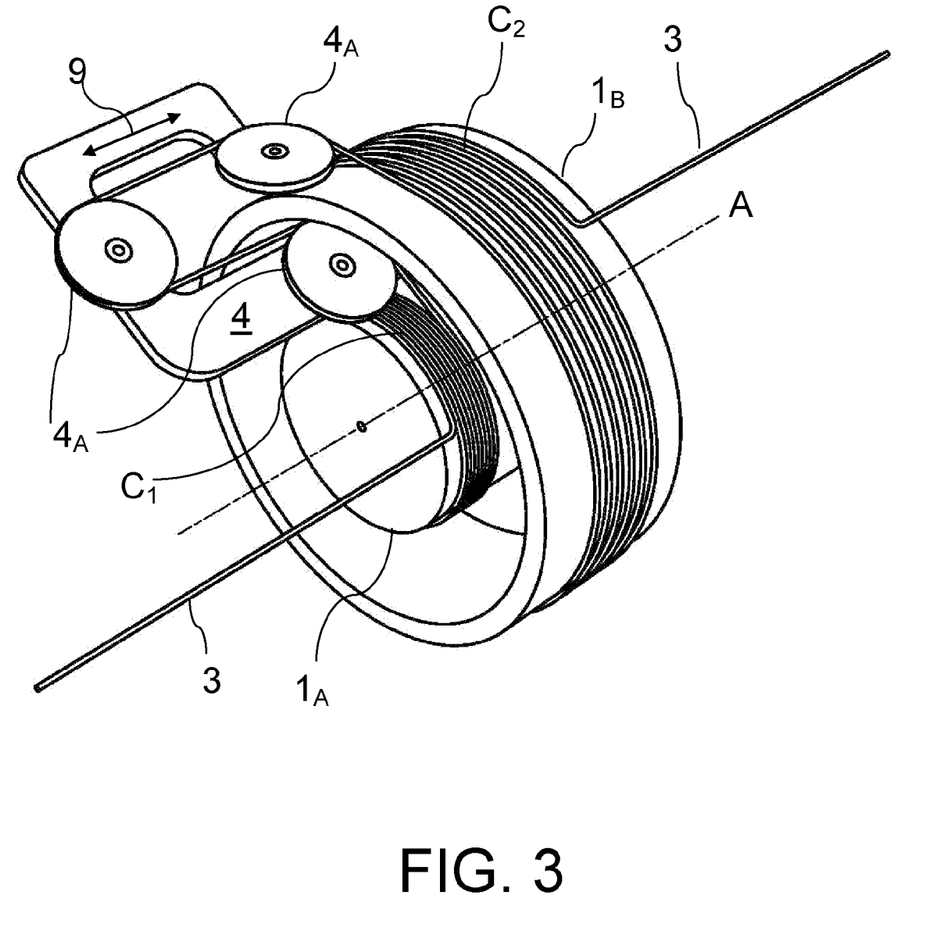
FIG. 3 illustrates a detailed embodiment of the swivel/rotary joint according to the invention where the spools are located inside each other.

In FIG. 3 as well as in FIG. 2 it is implied that the spools $1_{A,B}$ and the guiding arm 4 are coupled together such as to allow rotational movement of the second spool $1_B$ and the guide arm 4 with respect to each other and with respect to the first, fixed spool $1_A$, using for example ball bearings or elements with a similar function. Alternatively, the spools $1_{A,B}$ and the guiding arm 4 may be mounted on a common pin or cylindrical element (not shown) aligned along the common rotational axis A.

A typical application of the rotary joint or swivel device is with fibre optic streamer cables. A fibre optic streamer cable typically comprises a large number of fibres connecting all the sensors in a long streamer cable to a combination of a central signal source, a signal detection and a signal processing unit. There are no known rotary joints or swivel devices based on bulk optics that would be able to provide a rotary joint in an efficient manner for such a collection of optical fibres. The streamers are typically 30-50 mm outer diameter and many km long. They are shipped and deployed/retrieved from large reels for efficient installation and retrieval. The sensors along the optical fibres should be continuously connected to the interrogation unit for continuous verification of proper operation of the streamer during installation, operation and retrieval. This can be achieved by using the presently disclosed rotary joint with the seismic cable reel 30 as a separate unit. An even better solution would be to locate the rotary joint according to the present invention inside the core of the cable reel, as indicated on FIG. 2. This has the advantage of being able to reduce the total size of the unit so that it may fit inside small volumes.

The cable on the spools must include all the required fibres. However, the diameter of one fibre is only 250 micrometers (μm) and a large number of fibres can be integrated in a small cable. The cable will typically go from one spool to the other a fairly limited number of times (hundreds) and the tension is controlled by the automatic tension monitoring. For these reasons the cable does not need a very strong armouring for handing the tension and very few further elements for additional protection, thus simplifying the required structure of the connecting cable 3 in the rotary joint or swivel device. An advantage of placing the rotary joint inside a cable reel is that the rotary joint will be protected inside the core of the reel. As an alternative the rotary joint or swivel device may be located in a separate housing. The limited size of the connecting cable 3 and its small bending radius makes it possible to reduce the size of the spools to provide very compact rotary joint or swivel device.

The required torque to control the guiding arm will also be fairly low due to the same reasons. An important parameter in the design of such a system is the maximum numbers of rotations. This is defined by the dimensions of the main cable reel and the maximum length of the streamer. By using a cable with a small outer diameter and a small bending radius the spools can be made fairly small even for a large number of rotations.

The swivel according to the present invention may generally be used for reducing or eliminating torque that will normally arise when trying to stay connected to a cable being paid out from or retrieved to a cable drum, reel or similar device using conventional methods, that is in applications which a rotary joint or swivel device according to the presently disclosed techniques is not used it can be expected that an undesirable amount of cable torque could arise due to the rotated drum. Such applications could be in connecting sensors or instrumentation to rotating or gyrating structures such as in production equipment, construction machines, laboratory equipment, transport equipment, equipment on ships, trains or automobiles or airplanes.

The swivel device according to the present invention is limited to a number of rotations corresponding to the number of turns of connecting cable 3 coiled on the spools of the device. The rotary joint or swivel device is therefore best suited to applications in which a limited number of rotations can be expected. If it is allowed to insert a cable connection, however, the swivel could be disconnected from the cable when the end of its operation has been reached, so as to allow a refresh of the cable coils on the swivel or the replacement of the swivel by a "fresh" one with full capacity.

By minimizing the diameter of the connecting cable 3, the spool diameters may also be reduced while still permitting a fairly large number of coils of the connecting cable 3 on the spools $1_{A,B}$.

Also, to be able to reduce the spool diameter and size it will be desirable to use as a connecting cable that may have as small a bending radius as possible. A small bending radius of the connecting cable C also makes it possible to have small diameters of the guiding wheels of the guide arm $1_C$.

Figure 7:
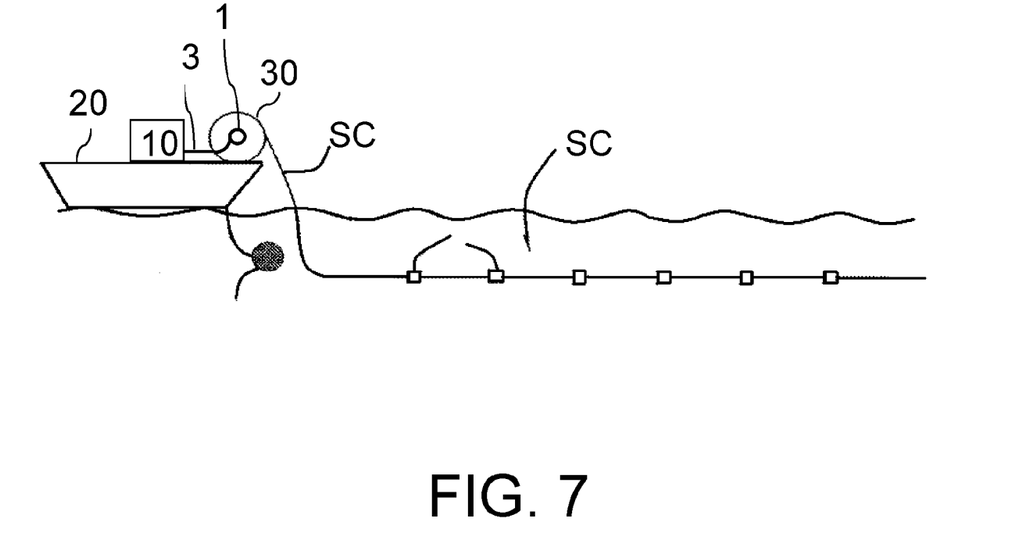
FIG. 7 illustrates in some more detail an application of the rotary joint or swivel device and method for connecting to a rotatable structure as set out in the invention.

As illustrated by FIG. 6 the swivel may find application in methods according to the invention in which a connecting cable 3 is arranged between a first structure 20 and a second structure 30 that are rotatable with respect to each other. When the cable is guided via a rotary joint or swivel device as described in this disclosure, the operation of the swivel device makes it possible to say connected to a rotatable item without causing a large and unacceptable torque in the connecting cable 3, for example when being used to stay connected to a cable SC being deployed or retrieved. As illustrated by FIG. 7 the method may comprise the deployment or retrieval of a seismic cable SC from or onto a vessel 20 at sea. In that case the method may include the operation of a seismic surveying system in which the first structure 20 is a vessel and the second structure 30 is a rotatable drum for deploying or retrieving a seismic cable SC. The seismic cable SC may contain an optical fibre and the cable is typically towed behind the vessel at sea, or lowered/raised to an ocean bottom placement location.

Although FIG. 7 indicates that there may be a space between the swivel device 1 and the cable drum 30, however, the second spool $1_B$ of the swivel will typically be coupled directly to the cable drum 30, as it is intended that the second spool $1_B$ shall rotate synchronously with the cable drum 30.

Even though FIG. 7 indicates that the rotary joint/swivel device is connected between the ship and the cable deployment drum 30, the swivel device 1 could equally well be coupled between the cable deployment drum 30 and the deployed streamer cable to reduce torque in the streamer cable. A person skilled in the art will also realize that a swivel device according to the present invention could be mounted between any two components in a cable deployment system which rotate with respect to each other. The major advantage of the use of the swivel device is that it enables monitoring equipment to stay connected to the cable and operating during deployment or retrieval of the cable. This means that any damage or unwanted behavior of the cable or its integrated or attached sensors may be detected before the full length of the cable has been deployed, and that measures can be taken to resolve the problem before permanent or irreparable damage has occurred.

An advantage of the present invention is that a connecting cable 3 may be allowed to connect to a rotatable part without necessarily having intolerable build-up of strain in the cable, and without necessitating the cutting of the cable as with slip ring type devices. This is particularly attractive when a cable includes optical fibres, as the cutting of optical fibres is technically complex and normally requires specialized equipment. The possibility of a swivel that can operate with a continuous cable without cutting is attractive.

Although the present invention has been described in connection with the specified embodiments related to seismic surveying activities, it should not be construed as being in any way limiting to the possible applications of the swivel device of the invention, for example in remote operation of submarine vessels, where typically a cable may connect a remotely operated vessel to a control and command centre. It is also envisaged that the present swivel device could be used in handling hydraulic cables in applications where it is of interest to reduce or minimize cable twist/torque. The same argument is also valid for electric cables.

The present invention may also be used on floating production, storage and offloading (FPSO) vessels in connecting on-board equipment on vessels with submerged devices. This way a cable suspended from the FPSO into the sea can be allowed to experience some rotation with respect to its longitudinal axis without causing excess torsion at the point of suspension on the FPSO. It is also envisaged that the swivel device according to the present invention could be used to connect a cable to a riser structure at the riser hang-off, whereby the swivel device is used to allow sufficient rotation of the cable.

In offshore drilling operations performed from floating vessels, such as a drilling vessel, a drilling barge, a semi-submersible or the like, it has been common to use ball joints or the like to accommodate motion of the vessel with respect to the wellhead and other equipment on the ocean floor. It is envisaged that the swivel device according to the present invention could be arranged to provide a swivel function for a cable structure that is connected to a rotary table on the vessel, or even connected to the riser itself, possibly a cable structure that is a part of the riser itself.

The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and could be advantageous.

The invention claimed is:

1. A rotary joint or swivel device for enabling a continuously operating connection between two items that rotate with respect to each other, the device comprising:
   a minimum of two spools coiling a connecting cable, a first spool being fixedly coupled to a first, static, item, and a second spool being fixedly coupled to a second, rotatable, item, wherein the first and second spools are arranged inside each other, and
   a rotatable guiding arm feeding the cable between the first spool and the second spool.

2. The rotary joint or swivel device according to claim 1, wherein the connecting cable enters/leaves the spools on the same side of the spools.

3. The rotary joint or swivel device according to claim 1, comprising a mechanism to the guiding arm in both directions.

4. The rotary joint or swivel device according to claim 3, wherein the guiding arm is coupled to a third element via a spring device for maintaining the connecting cable between the first and second spools tight.

5. The rotary joint or swivel device according to claim 1, comprising a system to control the tension in the cable between the spools.

6. The rotary joint or swivel device according to claim 1, wherein the first and second spools are in line or have an almost parallel axis of rotation.

7. The rotary joint or swivel device according to claim 1 in which the rotation axis for the guiding arm is in line with or almost parallel to an axis of the spools.

8. The rotary joint or swivel device according to claim 1, wherein the guiding arm is rotated by one or more devices from a group comprising; electric means, hydraulic means, and mechanical means.

9. The rotary joint or swivel device according to claim 1, wherein the guiding arm is controlled by friction or by a torque spring.

10. The rotary joint or swivel device according to claim 1, comprising torque monitoring means on at least one of the minimum two spools or on the guiding arm.

11. The rotary joint or swivel device according to claim 1, comprising cable positioning means arranged for positioning the cable in a controlled manner onto the spools.

12. The rotary joint or swivel device according to claim 1, wherein the connecting cable is guided by one or more cable guide elements coupled to the guiding arm.

13. The rotary joint or swivel device according to claim 12, wherein the one or more cable guide elements comprise one or more wheels having a groove along its wheel rim for the guiding of the cable.

14. The rotary joint or swivel device according to claim 1, wherein the guiding arm comprises a mechanical gear device which gives the right rotation to the guiding arm.

15. The rotary joint or swivel device according to claim 14, wherein the mechanical gear device of the guiding arm provides a coupling between the first spool and the second spool and thus provides controllable rotation of the guiding arm with respect to the first spool and the second spool.

16. The rotary joint or swivel device according to claim 1, wherein the connecting cable includes an optical fibre.

17. The rotary joint or swivel device according to claim 1, comprising a control system for controlling the rotation of the guiding arm, to ensure that the guiding arm is rotated at a rate of rotation adapted for moving a part of the connecting cable between the first and second spools while maintaining the connecting cable tight, i.e. to control the tension in the connecting cable.

18. The rotary joint or swivel device according to claim 1, wherein the first spool is fixed to a vessel, for example on the deck of a vessel.

19. The rotary joint or swivel device according to claim 1, wherein the second spool is coupled to a cable drum or cable reel containing at least a part of a seismic streamer cable.

20. The rotary joint or swivel device according to claim 1, wherein the rotatable guiding arm is controllably rotatable with respect to the rate of rotation of the second spool at a fixed ratio.

21. A method for enabling a continuously operating connection between two items that rotates with respect to each other, the method comprising:
    arranging a rotary joint or swivel device according to claim 1 between the two items.

22. The method according to claim 21, comprising the deploying or retrieving of a seismic cable from or onto a vessel at sea.

23. The method according to claim 21, comprising the deploying or retrieving of a seismic cable to or from an ocean bottom location.

24. The method according to claim 21, comprising operating a seismic surveying system, fixing the first spool on a vessel and coupling the second spool to a rotatable drum for deploying or retrieving a seismic cable.

25. The method according to claim 24, wherein the step of operating a seismic surveying system comprises towing a seismic cable containing an optical fibre behind a vessel at sea.

26. The rotary joint or swivel device according to claim 20, wherein the rotatable guiding arm is controllably rotatable with respect to the rate of rotation of the second spool at a ratio of 0.5.

* * * * *